United States Patent
Gohel et al.

(10) Patent No.: US 12,504,459 B2
(45) Date of Patent: Dec. 23, 2025

(54) INJECTING VIBRATIONS TO DETECT A FAULT IN A TRANSMISSION LINE

(71) Applicant: Teradyne, Inc., North Reading, MA (US)

(72) Inventors: Tushar Gohel, Winchester, MA (US); Zachary Farrer, Boston, MA (US); Daniel Desjardin, South Grafton, MA (US)

(73) Assignee: Teradyne, Inc., North Reading, MA (US)

( * ) Notice: Subject to any disclaimer, the term of this patent is extended or adjusted under 35 U.S.C. 154(b) by 110 days.

(21) Appl. No.: 18/525,384

(22) Filed: Nov. 30, 2023

(65) Prior Publication Data
US 2025/0180623 A1    Jun. 5, 2025

(51) Int. Cl.
*G01R 31/11*    (2006.01)
*G01R 31/52*    (2020.01)
*G01R 31/54*    (2020.01)

(52) U.S. Cl.
CPC .............. *G01R 31/11* (2013.01); *G01R 31/52* (2020.01); *G01R 31/54* (2020.01)

(58) Field of Classification Search
CPC ......... G01R 31/11; G01R 31/52; G01R 31/54
USPC .................. 324/533, 532, 527, 512, 500
See application file for complete search history.

(56) References Cited

U.S. PATENT DOCUMENTS

| | | |
|---|---|---|
| 4,734,637 A | 3/1988 | Chen et al. |
| 6,563,352 B1 | 5/2003 | Gohel et al. |
| 6,868,357 B2 | 3/2005 | Furse |
| 6,885,954 B2 | 4/2005 | Jones et al. |
| 6,894,505 B2 | 5/2005 | Gohel |
| 6,937,944 B2 | 8/2005 | Furse et al. |
| 7,069,163 B2 | 6/2006 | Gunther et al. |
| 7,075,309 B2 | 7/2006 | Smith |
| 7,165,200 B2 | 1/2007 | Jani et al. |
| 7,215,126 B2 | 5/2007 | Furse et al. |
| 7,250,772 B2 | 7/2007 | Furse et al. |
| 7,271,596 B2 | 9/2007 | Furse et al. |
| 7,282,922 B2 | 10/2007 | Lo et al. |
| 7,495,450 B2 | 2/2009 | Furse et al. |
| 7,548,071 B2 | 6/2009 | Harrison et al. |
| 7,622,931 B2 | 11/2009 | Wu et al. |
| 7,634,012 B2 | 12/2009 | Farhang-Boroujeny et al. |
| 8,310,270 B2 | 11/2012 | Gohel et al. |

(Continued)

FOREIGN PATENT DOCUMENTS

WO    2022/234704 A1    11/2022

OTHER PUBLICATIONS

International Search Report and Written Opinion received for PCT Patent Application No. PCT/US2024/057343, mailed on Mar. 24, 2025, 9 pages.

(Continued)

*Primary Examiner* — Giovanni Astacio-Oquendo
(74) *Attorney, Agent, or Firm* — ArentFox Schiff LLP

(57) ABSTRACT

An example system includes an apparatus configured to output an audio signal having a power level sufficient to generate a vibration in a transmission line comprising, or associated with, a device under test (DUT). The vibration exposes an intermittent fault in the transmission line. A detector is configured to monitor the transmission line and to detect information associated with the intermittent fault in the transmission line.

34 Claims, 6 Drawing Sheets

(56) References Cited

U.S. PATENT DOCUMENTS

| | | |
|---|---|---|
| 8,914,566 B2 | 12/2014 | Vandervalk et al. |
| 9,244,117 B2 | 1/2016 | Furse et al. |
| 10,250,957 B2 | 4/2019 | Gohel et al. |
| 10,404,363 B2 | 9/2019 | Gohel et al. |
| 10,404,364 B2 | 9/2019 | Gohel et al. |
| 10,504,307 B2 | 12/2019 | Courter et al. |
| 10,523,316 B2 | 12/2019 | Gohel et al. |
| 10,564,219 B2 | 2/2020 | Gohel et al. |
| 10,715,250 B2 | 7/2020 | Gohel et al. |
| 2004/0056666 A1* | 3/2004 | Gohel ............... G06F 13/4077 324/539 |
| 2006/0161827 A1 | 7/2006 | Gohel et al. |
| 2009/0091347 A1* | 4/2009 | Gohel ............. G01R 31/31924 324/764.01 |
| 2013/0106399 A1 | 5/2013 | Gohel et al. |
| 2013/0110445 A1 | 5/2013 | Kaushansky et al. |
| 2013/0110446 A1 | 5/2013 | Bourassa et al. |
| 2013/0124134 A1 | 5/2013 | Gohel |
| 2019/0033372 A1 | 1/2019 | Gohel et al. |
| 2021/0302224 A1 | 9/2021 | Yang et al. |
| 2022/0050013 A1 | 2/2022 | Champavere |
| 2023/0086626 A1 | 3/2023 | Pulikottil et al. |
| 2025/0180629 A1* | 6/2025 | Gohel ............... G01R 31/2822 |

OTHER PUBLICATIONS

Furse et al., "A critical comparison of reflectometry methods for location of wiring faults," Smart Structures and Systems, vol. 2, No. 1, pp. 25-46 (2006), 22 pages.

Furse et al., "Feasibility of Spread Spectrum Sensors for Location of Arcs on Live Wires," IEEE Sensors Journal, vol. 5, No. 6, pp. 1445-1450 (2005), 6 pages.

Furse et al., "Spread spectrum sensors for critical fault location on live wire networks," Structural Control and Health Monitoring 12:257-267 (2005), 11 pages.

LiveWire company overview, "Patented technology for monitoring, detecting and locating electrical faults in live systems," LiveWire Innovation, Inc. (Mar. 23, 2016), 1 page.

LiveWire Innovation, "Sentinel 100 SSTDR Engine LW-S100: Live Monitoring of Electrical Systems for the Detection and Location of Faults," [online] Retrieved from the Internet <URL: https://www.livewireinnovation.com/sstdr/> (2018), 7 pages.

LiveWire Innovation, "Sentinel 100 SSTDR Engine: Live Monitoring for the Detection and Location of Faults in Cables and Wires," LiveWire Innovation, Inc. (2017), 2 pages.

Reis et al, "Sequence and Spread Spectrum Time Domain Reflectometry for Transmission Line Analysis," Conference Proceedings of SPIE (Sep. 2007), 11 pages.

Sharma et al., "Low-Power STDR CMOS Sensor for Locating Faults in Aging Aircraft Wiring," IEEE Sensors Journal, vol. 7, No. 1, pp. 43-50 (2007), 8 pages.

Smith et al., "Analysis of Spread Spectrum Time Domain Reflectometry for Wire Fault Location," IEEE Sensors Journal, vol. 5, No. 6, pp. 1469-1478 (2005), 10 pages.

Stephenson, J., "Eliminating False Positives in the Detection and Location of sub 3ms Faults on AC/DC Lines," LiveWire Test Labs, Inc. (Apr. 11, 2011), 8 pages.

\* cited by examiner

INJECTING VIBRATIONS TO DETECT A FAULT IN A TRANSMISSION LINE

TECHNICAL FIELD

This specification describes example implementations of techniques for injecting vibrations to detect a fault in a transmission line.

BACKGROUND

A device under test (DUT) may be, or include, a transmission line or a device connected to the transmission line. Connections to, or among portions of, the transmission line may be a source of faults. An example fault may be the result of a weak connection. The fault may not present itself continuously, but rather may be intermittent. As a result, the fault may not always be detectable. Accordingly, using some testing techniques, such faults may not always be identified.

SUMMARY

An example system includes an apparatus configured to output an audio signal having a power level sufficient to generate a vibration in a transmission line comprising, or associated with, a device under test (DUT). The vibration exposes an intermittent fault in the transmission line. The system includes a signal source to repeatedly output multiple instances of a same electrical signal to the transmission line. A detector is configured to monitor the transmission line and to detect information associated with the intermittent fault in the transmission line. The detector may be configured to detect a difference in an attribute associated with the multiple instances of a same electrical signal on the transmission line. The difference in the attribute may correspond to the information associated with the intermittent fault. The example system may include one or more of the following features, either alone or in combination.

The apparatus may be or include a subwoofer. The apparatus may be or include a low frequency effects transducer. The system may include test equipment including pin electronics. The detector may include the pin electronics. The intermittent fault may include one or more broken mechanical or electrical connections in the transmission line. The one or more broken mechanical or electrical connections may include an open circuit in the transmission line. The transmission line may include one or more connectors. The one or more connectors may be susceptible to the vibrations to cause the open circuit. The audio signal may have a power level sufficient to generate a vibration of a structure of the DUT to which the transmission line is in contact. The vibration of the structure causes the vibration in the transmission line. The DUT may be powered off during vibration and monitoring. The power level sufficient to generate the vibration in the transmission line may exceed 250 Watts. The power level sufficient to generate the vibration in the transmission line may exceed 1 Kilowatt.

The signal source and the detector may be configured to perform time domain reflectometry (TDR), spread spectrum time domain reflectometry (SSTDR), and/or sequence time domain reflectometry (STDR) to detect the intermittent fault. The intermittent fault may relate to an electrical impedance of the transmission line.

An example method includes outputting an audio signal from an audio output device that is proximate to a device under test (DUT). The audio signal is output at a power level sufficient to generate a vibration in a transmission line comprising, or associated with, the DUT. The vibration exposes an intermittent fault in the transmission line. The method may include transmitting a known signal on the transmission line at least during output of the audio signal while monitoring the transmission line and detecting the intermittent fault in the transmission line during the monitoring. The example method may include one or more of the following features, either alone or in combination.

The method may include repeatedly outputting multiple instances of a same electrical signal to the transmission line. Detecting the intermittent fault may include determining a difference in an attribute associated with the multiple instances of the same electrical signal on the transmission line.

The audio signal may be output using a subwoofer. The audio signal may be output using a low frequency effects transducer. The intermittent fault may include one or more broken mechanical or electrical connections in the transmission line. The intermittent fault may include a short circuit on the transmission line. The intermittent fault may include a short circuit on the transmission line. The one or more broken mechanical or electrical connections may include an open circuit in the transmission line. The transmission line may include one or more connectors. The one or more connectors may be susceptible to the vibrations to cause the open circuit. The audio signal may have a power level sufficient to generate a vibration of a structure of the DUT to which the transmission line is in contact. The vibration of the structure may cause the vibration in the transmission line. The DUT may be powered off during vibration, monitoring, and detecting. The power level sufficient to generate the vibration in the transmission line may exceed 250 Watts. The power level sufficient to generate the vibration in the transmission line may exceed 1 Kilowatt.

Detecting the intermittent fault may include performing time domain reflectometry (TDR), spread spectrum time domain reflectometry (SSTDR), and/or sequence time domain reflectometry (STDR) to detect the intermittent fault. The intermittent fault may relate to an electrical impedance of the transmission line.

An example system includes a vibration source configured generate a vibration in a vicinity of a transmission line comprising, or associated with, a device under test (DUT). The vibration exposes an intermittent fault in the transmission line. A signal source is configured to output a signal on the transmission line, A detector is configured to monitor the transmission line at least following output of the signal and to detect information associated with the intermittent fault in the transmission line. The example system may include one or more of the following features, either alone or in combination.

The vibration source may be or include a motor. The vibration source may be or include an audio output device. The vibration source may include multiple motors configured to operate in a vicinity of the transmission line.

Any two or more of the features described in this specification, including in this summary section, may be combined to form implementations not specifically described in this specification.

At least part of the devices, systems, and processes described in this specification may be configured or controlled by executing, on one or more processing devices, instructions that are stored on one or more non-transitory machine-readable storage media. Examples of non-transitory machine-readable storage media include read-only memory, an optical disk drive, memory disk drive, and random access memory. At least part of the devices, systems, and processes described in this specification may be configured or controlled using a computing system comprised of one or more processing devices and memory storing instructions that are executable by the one or more processing devices to perform various control operations. The devices, systems, and processes described in this specification may be configured, for example, through design, construction, composition, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different Figures indicate like elements.

DETAILED DESCRIPTION

Figure 1:
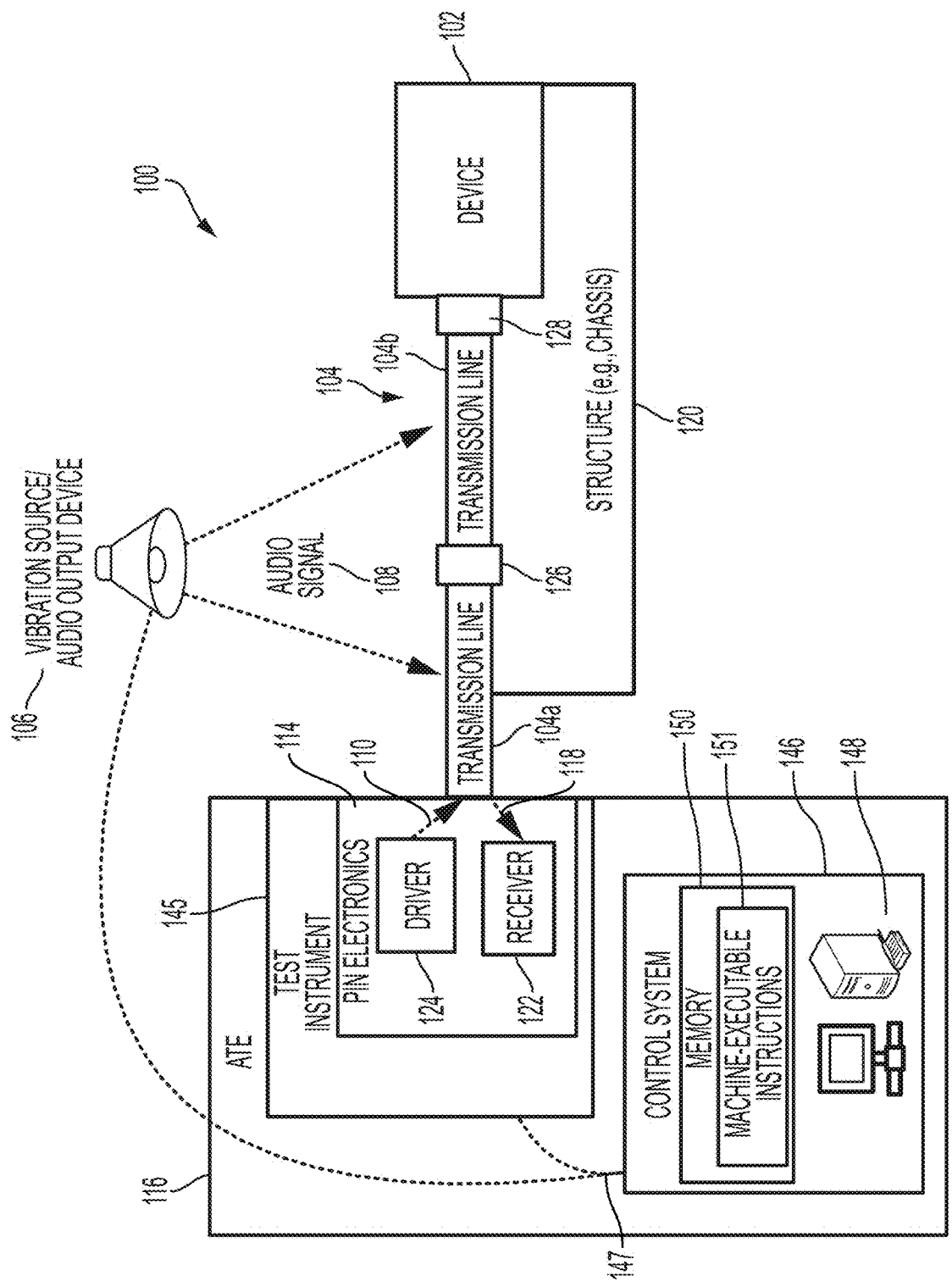
FIG. 1 is a block diagram of an example system for detecting a fault in a connection to, or along, a transmission line assembly.

Described herein are examples example implementations of techniques for exciting a transmission line using an audio signal to expose and to detect faults in the transmission line or a device connected thereto. In some examples, the device under test (DUT) may be or include the electronic device that is distinct from the transmission line and, in some examples, the DUT may be or include the transmission line itself.

As described herein, a transmission line includes any type of cable, wire, printed circuit board (PCB) microstrip or stripline, or other type of electrically-conductive medium capable of transmitting electrical signals. An electrical signal includes, but is not limited to, an electromagnetic wave. A transmission line may include an assembly comprised of two or more such cables, wires, PCB microstrips or striplines, or other type of electrically conductive media connected using one or more electrical connectors.

An example vibration source includes an apparatus configured to generate vibrations in a vicinity of a transmission line and inject those vibrations into the transmission line either directly or indirectly. An example vibration source is an audio output device configured to output high-power, low-frequency audio signals to generate vibrations that excite a transmission line or structure associated with—for example, in physical contact with—the transmission line. For example, the audio output device can include audio sources such as subwoofers, low frequency effects transducers (known colloquially as "buttkickers"), or other loudspeakers that can emit low-frequency audio signals. In some implementations, these audio signals may have frequencies of 15 Hertz (Hz) to 300 Hz, 15 Hz to 200 Hz, 15 Hz to 100 Hz, 100 Hz to 400 Hz, more than 300 Hz, or less than 15 Hz. In some implementations, these audio signals may have signal power levels of 100 watts (W) or more, 200 W or more, 250 W or more, 1 kilowatt (KW) or more, 2 KW or more, and so forth. In an example, the audio signals may have a frequency with a range of 15 Hz to 300 Hz and a signal power greater than 100 W; in another example, the audio signals may have a frequency with a range of 15 Hz to 300 Hz and a signal power greater than 1 KW; and in still another example, the audio signals may have a frequency greater than 15 Hz and a signal power greater than 100 W.

Any combination of frequency and power may be used, with the combination of frequency and power being based, at least in part, on the physical size of the transmission line or structure being excited and how tightly the transmission line is coupled to such a structure. In some implementations, a constant tone, frequency, and/or power is not used. An audio output device may produced and output audio signals having frequencies that vary and/or having powers that vary. The techniques described herein are not limited to using audio signals having the power levels, the frequencies, or the combinations of power levels and frequencies listed herein.

The audio signal creates vibrations directly or indirectly in the transmission line, which may cause connections in or to the transmission line to break, at least in part and at least some of the time. An example of an indirect vibration includes vibrating a frame on which the transmission line is mounted which, in turn, also vibrates the transmission line. Another example of an indirect vibration includes sound vibrating a floor on which a subwoofer is sitting, causing any equipment including a transmission line on that surface also to vibrate. An example of a direct vibration includes vibrating a ribbon cable conducting a signal being tested. Resulting connection breaks can be identified using techniques such as, but not limited to, the time domain reflectometry processes described herein. The connections may break at connector junctions or simply at sensitive points in the transmission line that may have worn due to harsh conditions.

The techniques described herein may have advantages in that the audio signals at frequencies and powers such as those described above can produce sufficient physical vibrations in the system by stimulating one or more surfaces upon which a transmission line is secured without requiring the audio source to be in direct physical contact with the transmission line. The techniques described herein also do not rely voltage stimulation to stress a transmission line. Thus, the techniques may be relatively simple to use, require relatively little extra hardware, and may not require reconfiguration of a transmission line or structure to which it is connected.

FIG. 1 is a block diagram of an example of a test setup 100 that may be used to test a test transmission line in the manner described herein. In this example, test setup 100 includes a transmission line assembly ("assembly") 104 containing two transmission lines 104a and 104b. Although two transmission lines are shown, transmission line assembly 104 may contain fewer than two transmission lines or more than two transmission lines, e.g., three, four, five, six, and so forth transmission lines. The transmission lines may be of the type described above. Adjacent transmission lines 104a, 104b may be interconnected by an electrical connector ("connector") 126, examples of which include, but are not limited to, coaxial connectors, blind-mate connectors, universal serial bus (USB) connectors, or the like. Assembly 104 is an example "transmission line"; however, it is referred to as an "assembly" to differentiate it in this description from its individual transmission line components 104a, 104b.

Assembly 104 is connected to device 102 via connector 128. Connector 128 may be an electrical connector, such as those described above. Electrical signals pass over assembly 104 to and from device 102. The electrical signals may be used to test connection of assembly 104 to device 102, connections within assembly 104, and the integrity of the transmission lines themselves that are part of the assembly.

In some implementations, device 102 may be an electronic device such as cockpit avionics or other on-board electrical systems or system within a large vehicle such as a tank or an aircraft, as explained below. However, device 102 may be any type of electronic device in any type of small- or large-scale system.

In this example, the vehicle may include a chassis 120 or other structure or structures, on which assembly 104 may be physically supported, through which assembly 104 may run, or which is otherwise in direct or indirect contact with assembly 104. In this example, chassis 120 itself may include a structure of a vehicle, such as the vehicle's frame. Chassis 120 may be tens, hundreds, or thousands of kilograms, but responsive to audio signal vibrations of the type described herein. In this example, this means that the audio signals described herein produce vibrations in chassis 120 that transfer to assembly 104. Such vibrations may cause, for example, mechanical and/or electrical connections in connectors 126 or 128 to break in whole or in part.

In some implementations, there may be no structure or chassis in the test setup. For example, transmission line assembly 104 may be unsupported and tested independently of such structure or chassis.

Example test setup 100 includes audio output device 106, examples of which are described above. Audio output device 106 may be configured to emit a constant or varying low-frequency, high-power audio signal 108, such as those described above, in the vicinity of, e.g., directed towards, assembly 104 or structure/chassis 120. Audio output device may be located 1 meter (m), 2 m, 3 m, 4 m, 5 m, or more or less from assembly 104 or structure/chassis 120. In some implementations, there may be two, three, four, or more such audio output devices, all of which may be configured and controlled to output the same low-frequency, high-power audio signal or different low-frequency, high-power audio signals. In this example, audio output device 106 is configured to output the audio signals at frequencies and powers such as those described above. The frequency and/or power of audio signal 108 may be controlled manually or programmatically through a test program executed by automatic test equipment (ATE) 116.

Test setup 100 includes ATE 116, which is a type of test system. In general, ATE 116 is configured to test the operation of a DUT, such as device 102, assembly 104, or both. In some examples, ATE 116 includes test instrumentation to send test (electrical) signals, such as analog or digital signals and/or data, to or over the DUT for testing. The DUT may reply with, or transmit, response signals that are responsive to the test signals. The test system expects the response signals to contain certain values and/or to have a certain timing, for example. If the response signals have the appropriate values and/or timing, the DUT passes testing. If the response signals do not have those values and/or timing, then the DUT may fail testing.

ATE 116 may be configured to perform one or more types of TDR testing. Example TDR testing includes outputting an electrical signal containing an incident edge onto a transmission line, measuring the incident edge and a reflection of the incident edge on the transmission line, and determining a signal path length based on a difference between the two measurements. TDR testing may be used to identify short circuits, open circuits, or other attributes of a transmission line, such as impedances along the transmission line. U.S. Pat. No. 4,734,637, titled "Apparatus For Measuring The Length Of An Electrical Line", describes an example TDR implementation that may be performed by ATE 116. The contents of U.S. Pat. No. 4,734,637 relating to its example TDR implementation are incorporated herein by reference. TDR may be performed while device 102 is off; that is, not operational.

ATE 116 may be configured to perform spread spectrum time domain reflectometry (SSTDR) testing. Example SSTDR works by sending a stream of electrical signal ones and zeros, waiting for reflected ones and zeros, and performing autocorrelation to determine a location of a fault. Stated otherwise, SSTDR outputs spread spectrum electrical signals onto a transmission line and waits for those signals to be reflected back to ATE 116. Autocorrelation may be used to determine characteristics of the transmission line. Mathematical algorithms may be applied to both the shape and timing of the signals to locate, e.g., a short or an open circuit on the transmission line or other attribute of the transmission line. U.S. Pat. No. 10,504,307, titled "System And Method For Spread-Spectrum Time-Domain Reflectometry And Design Data Wire Testing", describes an example SSTDR implementation that may be performed by ATE 116. The contents of U.S. Pat. No. 10,504,307 relating to its example SSTDR implementation are incorporated herein by reference. An example SSTDR implementation that may be performed by ATE 116 is also described in Reis, et al, "Sequence and Spread Spectrum Time Domain Reflectometry for Transmission Line Analysis", Conference: Proceedings of SPIE (September 2007), the contents of which are incorporated herein by reference.

SSTDR can be executed when device 102 is on, so SSTDR can be used to continuously, periodically, or intermittently monitor a transmission line for intermittent faults in a large vehicle, (e.g., on an airplane while the airplane is in flight) allowing for fault monitoring over long periods of time. SSTDR may also benefit from the vehicle's (e.g., the airplane's) vibrations during operation to create small mechanical movements in the transmission line that may stress weak or electrical connectors. The mechanical stresses to the transmission lines increases the intermittency of the cables allowing for quicker detection of the faults. For SSTDR, the transmitted signal may be a very slow, low-frequency signal relative to existing signals on the transmission line as to not interfere with the existing signals on the transmission line. SSTDR may also be particularly suited to operation over a power line that operates at low frequencies.

ATE 116 may be configured to perform sequence time domain reflectometry (STDR) testing. Example STDR includes generating a sequence signal and transmitting the sequence signal over the transmission line. ATE 116 receives one or more reflection signals over the transmission line and performs reflection signal processing on the reflection signals to locate, e.g., a short or an open circuit on the transmission line or other attribute of the transmission line. U.S. Pat. No. 6,885,954 titled "Sequence Time Domain Reflectometry Using Complementary Golay Codes" describes an example STDR implementation that may be performed by ATE 116. The contents of U.S. Pat. No. 6,885,954 relating to its example STDR implementation are incorporated herein by reference. An example STDR implementation that may be performed by ATE 116 is also described in Reis, et al, "Sequence and Spread Spectrum Time Domain Reflectometry for Transmission Line Analysis", Conference: Proceedings of SPIE (September 2007), the contents of which are incorporated by reference above.

TDR measurements of a stable transmission network comprised of one or more transmission lines may have little variance. Repetitive measurements of the same network may be used to find intermittent faults. The vibrations produced by the audio signals described herein may expose these intermittent faults. In this regard, intermittent faults occur intermittently and therefore may not always be detected using some types of test equipment. One way to check for intermittent faults is to examine the transmission line over time. By periodically, intermittently, or continually capturing data using one or more TDR processes such as those listed previously, comparisons can be made between different instances of the same electrical signal (also called "waveform") to look for subtle changes over time. For example, comparisons may be made between attributes of the different instances of the same electrical signal, such as voltage magnitudes or timing of pulses of other features of the different instances of the same electrical signal, at two or more different points in time. In this regard, the different instances of the same electrical signal on the transmission line may be virtually identical from capture to capture. If there are substantial differences between captures, this may indicate a potential intermittent fail point. For example, if there is wire or a connection that occasionally makes contact, the TDR data would show that the length of the cable is different for different instances of the same electrical signal. A more subtle situation may be that a 500 impedance at one point on the transmission line occasionally goes to 600 when run over a period of time. This change may imply a potential intermittent fault. This information may be obtained based on the data captured by the examples TDR processes described herein.

In more detail, the intermittent faults may be detected by the pin electronics outputting different instances of the same electrical signal repeatedly over the same transmission line. Circuitry in the ATE performs any of the TDR techniques described herein or any other appropriate techniques to identify intermittent faults. For example, the pin electronics outputs different instances of the same electrical signal onto the transmission line and detects data for each instance of the same electrical signal output on the same transmission line. One or more processing devices, which may be part of the control system or other hardware as described herein, performs the processing described herein (including, for example, TDR, STDR, or SSTDR processing) to determine attributes of the transmission line for different instances of the same electrical signal. The one or more processing devices compare the attributes for one instance of the electrical signal to corresponding attributes for one or more other instances of the electrical signal. Differences in attributes, as described herein, may be identified.

In some cases, the differences in attributes may be deemed insignificant, whereas in other cases the differences in the attributes may be deemed significant enough to indicate an intermittent fault. The one or more processing devices may compare differences to thresholds to determine whether the differences are significant enough to indicate an intermittent fault. For example, an intermittent fault may be indicated if different instances of an attribute from different data captures for different instances of the same electrical signal differ by 10%, 20%, 30%, 40%, 50%, or more or less. For example, if the threshold is 10% and the impedance at one point on the transmission line is 500 for one data capture for an instance of an electrical signal, and the impedance at the same point on the same transmission line is 600 for another data capture for another instance of the same electrical signal, then the difference between the two data captures exceeds 10% and an intermittent fault may be identified. On the other hand, if the threshold is 10% and the impedance at one point on the transmission line is 500 for one data capture for an instance of an electrical signal, and the impedance at the same point on the same transmission line is 530 for another data capture for another instance of the same electrical signal, then the difference between the two data captures is less 10% and an intermittent fault may not be identified. In some implementations, the threshold may be set by a user. For example, the user may program the threshold into the ATE. The threshold may be reset and/or changes for different transmission lines and different attributes. In some examples, the "same electrical signal" for subsequent samples may be a different instance of the electrical signal output for the first sample that is identical or substantially identical to the electrical signal output for the first sample. For example, the "same electrical signal" may include different instances of an electrical signal having the same shape, magnitude timing, and/or other characteristics output to the transmission line repeatedly.

ATE 116 may include multiple test instruments such as test instrument 145, each of which may be configured, as appropriate, to implement testing (e.g., TDR, STDR, or SSTDR testing) and/or other functions. Although only one instrument 145 is shown, ATE 116 may include any appropriate number of test instruments, including one or more external test instruments. The test instruments may be hardware devices that may include one or more processing devices and/or other circuitry. The test instruments may be configured—for example, programmed—to output signals to test DUTs. The signals may be or include instructions, commands, data, parameters, variables, test patterns, and/or any other information designed to elicit response(s) from the DUT. The signals may also include the signals described herein to perform TDR techniques such as those described herein, namely TDR, STDR, and/or SSTDR.

Test instrument 145 may include pin electronics 114. Example pin electronics includes electronic circuitry that connects to a DUT. The electronic circuitry may be analog, but that is not a requirement. The pin electronics is configured to deliver electrical signals, such as power, voltages, and currents, and is configured to measure a device pin's response, drive, and electrical characteristics to the delivered signals. In this example, pin electronics 114 is an instance of multiple circuits that are each associated with a pin of device 102 and that each may be connected to a different instance of assembly 104. In some implementations of ATE 116, multiple pin electronics circuits may be used in parallel to test hundreds to thousands of pins of DUTs, such as device 102.

Pin electronics 114 may be configured—for example, programmed and/or controlled—to function as part of a detector circuit by performing TDR, STDR, and/or SSTDR testing on assembly 104. Pin electronics 114 includes a driver circuit 124 and a receiver circuit 122. Driver circuit 124 includes any electronic device, such as a voltage and/or current output device, configured to output electrical signals, such as the signals described above onto assembly 104 for TDR, STDR, and/or SSTDR testing. Receiver circuit 122 is configured to receive a signal, such as an incident or reflected electrical signal, from the assembly 104 for TDR, STDR, and/or SSTDR testing. Receiver circuit 122 may include a comparator to compare incident and reflected edges to a threshold to identify those selected edges. The timings of the incident and reflected edges may be processed by the test instrument or a control system, either of which may be another part of the detector circuit, to identify, for example, a location of the reflection and, thus, where the fault on the transmission line is located.

In some implementations, circuitry within ATE 116 or circuitry within test instrument 145 that is other than (that is, different from) pin electronics 114 may be used to perform the signal output and detection functions included in the TDR, STDR, and/or SSTDR testing described herein.

Control system 146 is configured to—for example, programmed to—communicate with audio output device 106 and with test instrument 145 and other test instruments (not shown) in ATE 116 to direct and/or to control testing of transmission line assembly 104 and/or device 102 as described herein. In some implementations, this communication 147 may be over a computer network or via a direct connection such as a computer bus or buses or an optical medium or media. In some implementations, the computer network may be or include a local area network (LAN) or a wide area network (WAN). The control system may be or include a computing system comprised of one or more processing devices 148 (e.g., microprocessor(s)) and memory 150 for storing machine-executable instructions 151. The one or more processing devices 148 may be configured to execute machine-executable instructions 151 to perform the operations described herein, including those described with respect to FIG. 3 and to control and implement TDR, STDR, and/or SSTDR testing including analyzing incident and reflected signals as part of the TDR, STDR, and/or SSTDR testing to identify faults, including intermittent faults, in a transmission line assembly. In some implementations, test instrument 145 may include one or more processing devices that perform these operations attributed to the control system.

Figure 2:
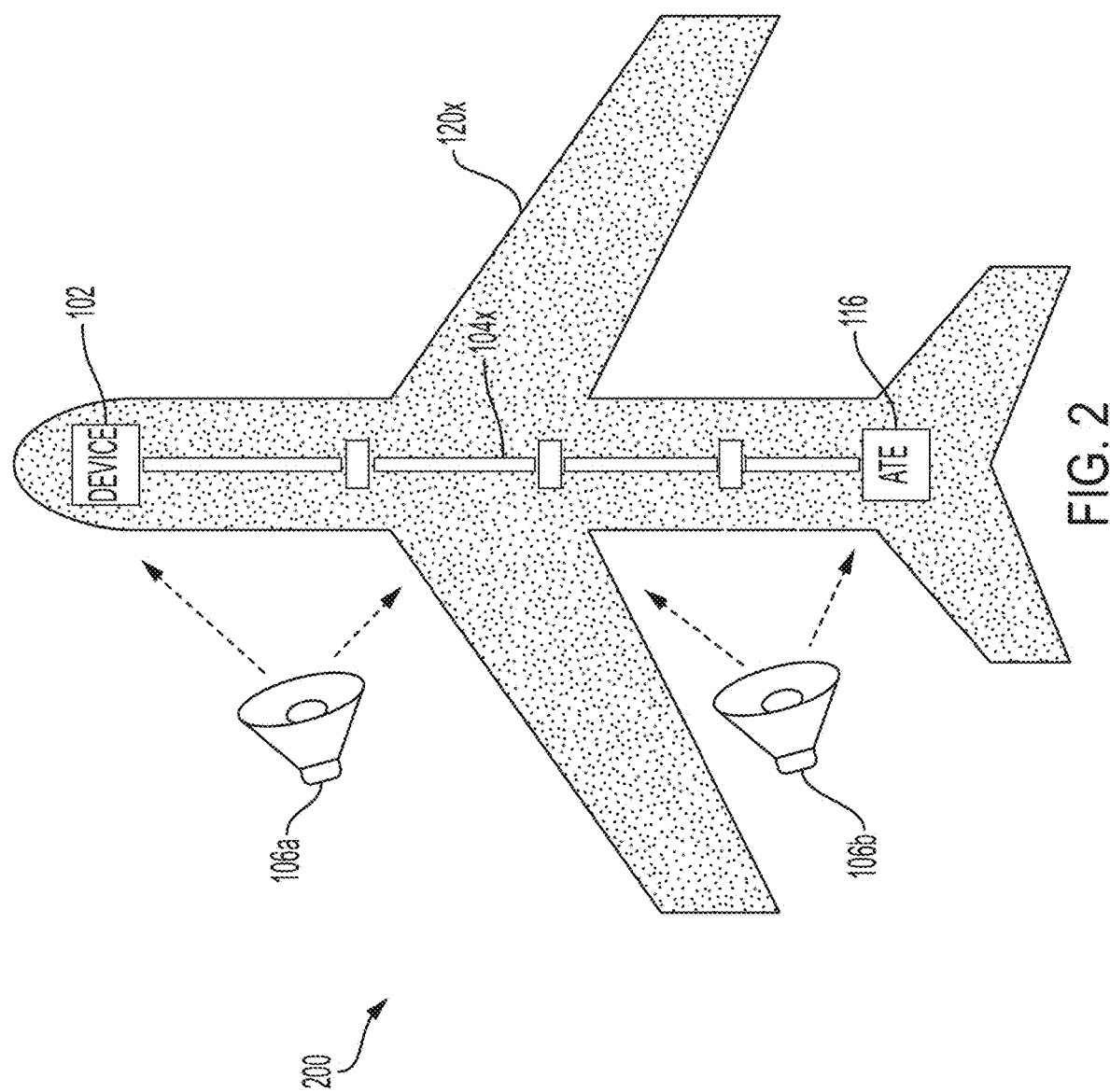
FIG. 2 is a block diagram of example large vehicle that may be tested using the example system.

FIG. 2 shows an example of an aircraft having device 102 and a transmission line assembly 104x. Transmission line assembly 104x may be a version of transmission line assembly 104. One or both of transmission line assembly 104x and device 102 may be tested using ATE 116 and one or more audio output devices 106a, 106b, which may have the same structure and function as audio output device 106 of FIG. 1. Transmission line assembly 104x may be supported within fuselage 120x, which is example of chassis 120. Transmission line assembly 104x may span throughout aircraft 200 to interconnect various components of the aircraft 200, such as components of the wings, the landing gear, the stabilizers, the cockpit, and/or the engine, etc. In the example of FIG. 2, device 102 may be or include cockpit avionics or other on-board electrical systems or system within the cockpit.

Figure 3:
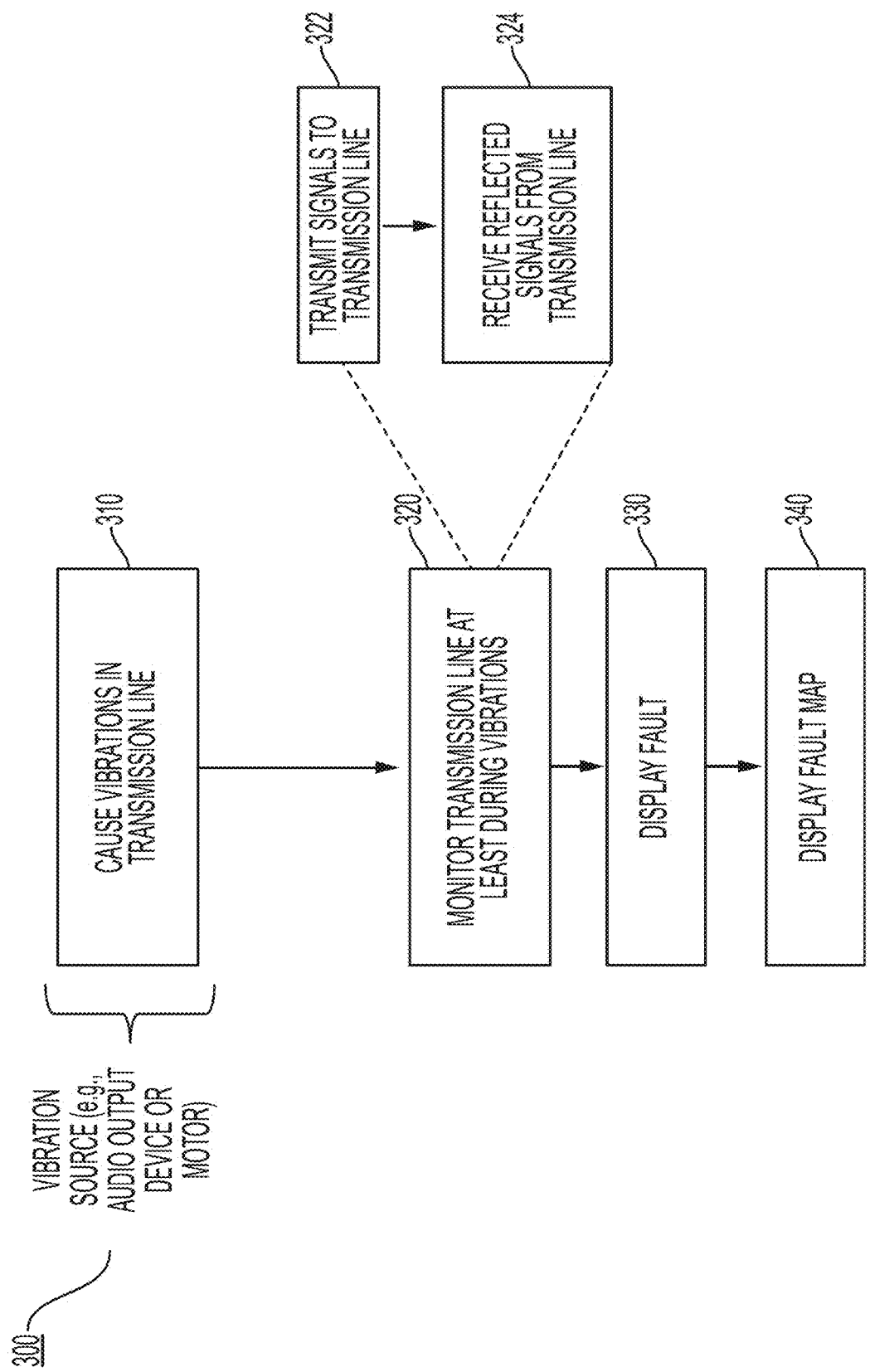
FIG. 3 is a flowchart showing example operations included in an example process for detecting a fault in a connection to, or along, a transmission line assembly.

FIG. 3 shows example operations included in an example process 300 for exposing and detecting faults in a system, such as the examples shown in FIGS. 1 and 2. All or part of process 300 may be implemented and/or controlled by control system 146 and/or test instrument 145.

According to process 300, the control system controls audio output device 106 (or 106a, 106b) to output (310) one or more audio signals in the vicinity of a device or devices being tested, such as assembly 104 and/or device 102. For example, the control system may control audio output device 106 to output (310) one or more audio signals toward assembly 104 and/or device 102 or in the vicinity of, or toward, a structure, such as chassis 120, supporting or holding assembly 104. The audio signals may be low-frequency, high-power audio signals of the type described herein that cause vibrations in assembly 104, device 102, and/or the structure supporting assembly 104 and/or device 102, which transfers its vibrations to assembly 104 and/or device 102.

The vibrations in assembly 104 and/or device 102 expose one or more faults, such as one or more weak connections within assembly 104 or between assembly 104 and device 102. A weak connection in this context may include a connector that is susceptible to permanent or intermittent disconnection/breakage in response to vibrations produced by the low-frequency, high-power audio signals of the type provided by the audio output device(s). The resulting disconnection may cause an open circuit or a change in impedance—for example, a greater impedance that expected for that connection if the disconnection is only partial and not a complete disconnection that would cause an open circuit. The same may occur in a portion of the transmission line that is worn, but that is not part of a connection.

In some implementations, the control system controls audio output device 106 (or 106a, 106b) to vary the frequency and/or the power of the audio output signals during output. For example, only the frequency of the audio signals may be progressively or step-wise increased or decreased, only the power of the audio signals may be progressively or step-wise increased or decreased, and/or the both of the frequency and power of the audio signals may be progressively or step-wise increased or decreased. Varying the frequency and/or power of the audio signals may make it more likely that vibrations induce in the transmission line assembly during testing.

Device 102 may be operational—that is, on—or non-operational—that is, off—during testing. For example, device 102 may be on or off while the system controls the audio output device to output (310) the one or more audio signals.

Process 300 includes the control system or the test instrument controlling pin electronics 114 or other circuitry within the ATE or the test instrument to monitor (320) the transmission line assembly at least during output (320) of the audio signal. For example, the pin electronics may be controlled to monitor (320) the transmission line assembly during the entirety of the time that the audio signal is output, part of the time that the audio signal is output, after the audio signal has stopped, or any combination of these. Generally, monitoring may include controlling driver 124 to output electrical signals (322) to the transmission line assembly and detecting reflections thereof. Examples of the electrical signals that may be output (322) include signal edges for TDR, sequence signals for STDR, or spread-spectrum signals for SSTDR. Monitoring (320) may include receiver 122 detecting data on the transmission line following output of the electrical signals. For example, reflected signals may be compared to a threshold to detect the reflected signals. The control system or test instrument may set and/or vary the threshold based on the power and/or frequency of the incident signals. Monitoring (320) may also include one or more processing devices in the ATE or test instrument performing TDR, STDR, or SSTDR to detect faults in the transmission line assembly based on the detected data. For example, in the case that TDR or STDR are used to perform the monitoring, device 102 may be off, whereas in the case that SSTDR is used to perform the monitoring, device 102 may be on.

Process 300 analyzes the incident and reflected signals using TDR, STDR, or SSTDR processes to detect (330) one or more faults in the transmission line assembly. More specifically, when an intermittent fault occurs in the transmission line, the impedance of the transmission line changes at the location of the fault. This causes a whole or partial reflection of the incident signal at the location of the fault. The location of that fault is identified using TDR, STDR, or SSTDR, and compared against an expected point of reflection on the cable, such as the known end of the cable. If TDR, STDR, or SSTDR indicates that the reflection came from an unexpected location, then a fault is identified. In some implementations, there may be multiple reflections corresponding to multiple faults along the same transmission line assembly.

In some implementations, operations 320 and 330 may be repeated multiple—for example, two, three, four, or more—times for different instances of the same electrical signal transmitted over the same transmission line. Attributes of the transmission line may be determined for each instance of the same electrical signal transmission line using the TDR techniques described herein. Attributes determined for different instances of the same electrical signal may be compared by one or more processing devices in the control system or the test instrument. If the attributes differ by more than a predefined threshold for two or more instances of the same electrical signal, then process 300 detects (330) an intermittent fault. If the attributes do not differ by more than a predefined threshold for two or more instances of the same electrical signal, then process 300 does not detect (330) an intermittent fault.

Figure 4:
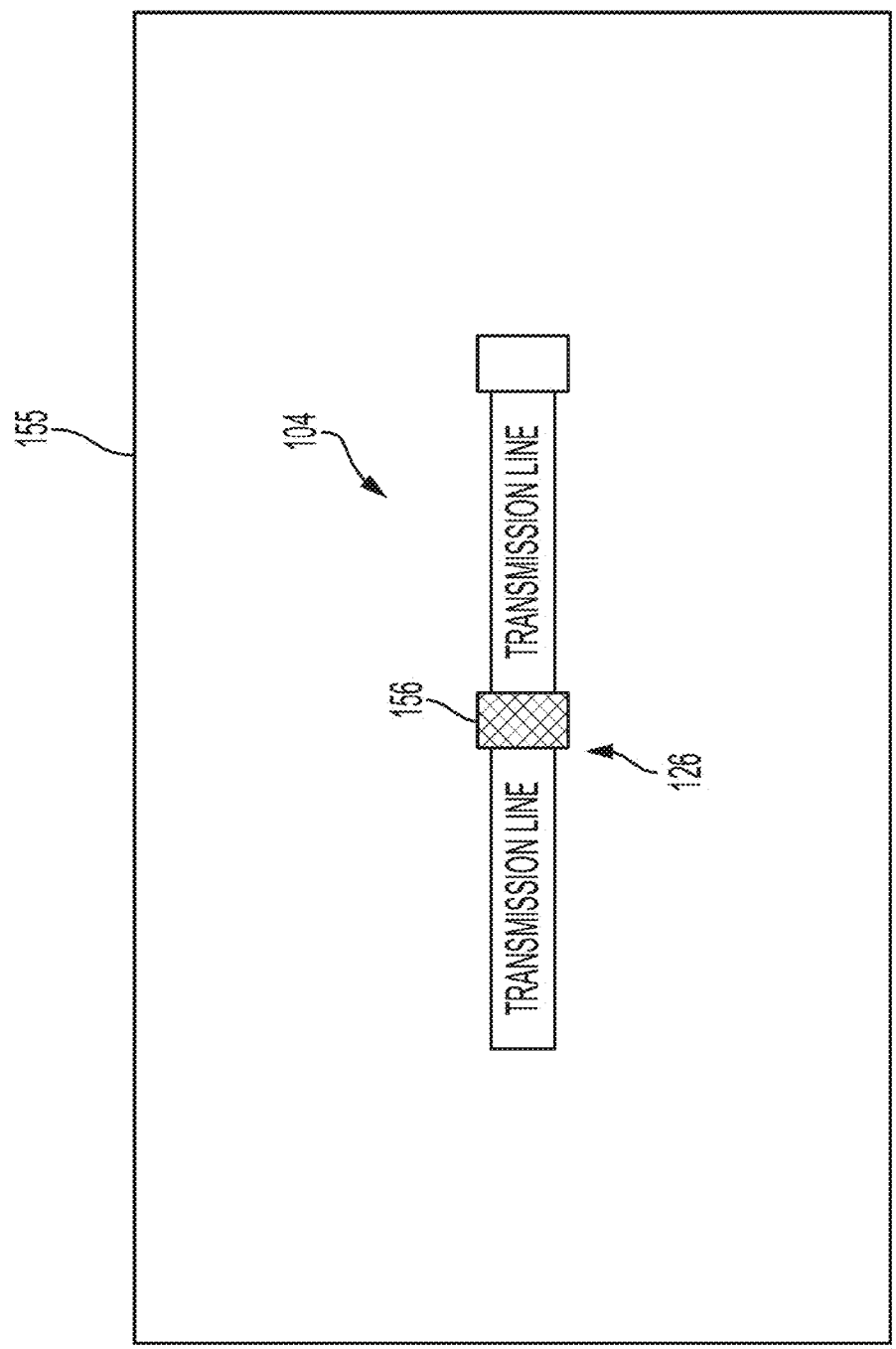
FIG. 4 is an example fault map generated and displayed by the example process.

In some implementations, process 300 may be configured to generate and to display (340), on a computer monitor or other display device, a fault map. The fault map may include a graphical representation of the transmission line assembly and highlight a location of a detected fault. For example, as shown in FIG. 4, a display device 155 may display a graphical representation of transmission line 104 and highlight fault 156 in connector 126 detected by process 300 using cross-hatching or other identifying indicia. In some implementations, other information may be displayed, such as, but not limited to, the length of the transmission line, the impedance detected at the fault, the distance to the fault, and so forth.

Although electrical transmission lines are described herein, the systems and processes described herein may also be used with optical transmission line assemblies, comprised of two or more optical media connected by a connector.

The preceding examples describe creating the vibrations using an audio output device as the vibration source. In some implementations, the vibrations may be created, and injected into the transmission line, using an other type of vibration source, such as a motor. An example motor may generate vibrations in the ranges described herein or at frequencies of greater than 100 Hz, greater than 200 Hz, greater than 300 Hz, greater, than 400 Hz, or at frequencies less than 100 Hz. For example, the motor or other type of vibration source may be in direct contact with the transmission line assembly or in indirect contact with transmission assembly as described herein. In an example, a motor may be controlled by the test system described herein to produce constant or varying low-frequency vibrations in the vicinity of a transmission line assembly, such as transmission line assembly 104. The motor or other type of vibration source may be located at any appropriate location relative to the transmission line assembly. The location of the motor or other type of vibration source may depend on the magnitude and frequency of vibrations that the motor can generate and the magnitude and frequency of vibrations needed to produce faults in the transmission line assembly. In the example of FIG. 2, the motor or other type of vibration source maybe located 1 m, 2 m, 3 m, 4 m, 5 m, or more or less from assembly 104x or structure/chassis 120. As was the case with the audio output devices, more than one motor may be used and controlled by the test system to produce the same, or different, magnitudes and frequencies of vibrations in the vicinity of the transmission line assembly.

Figure 5:
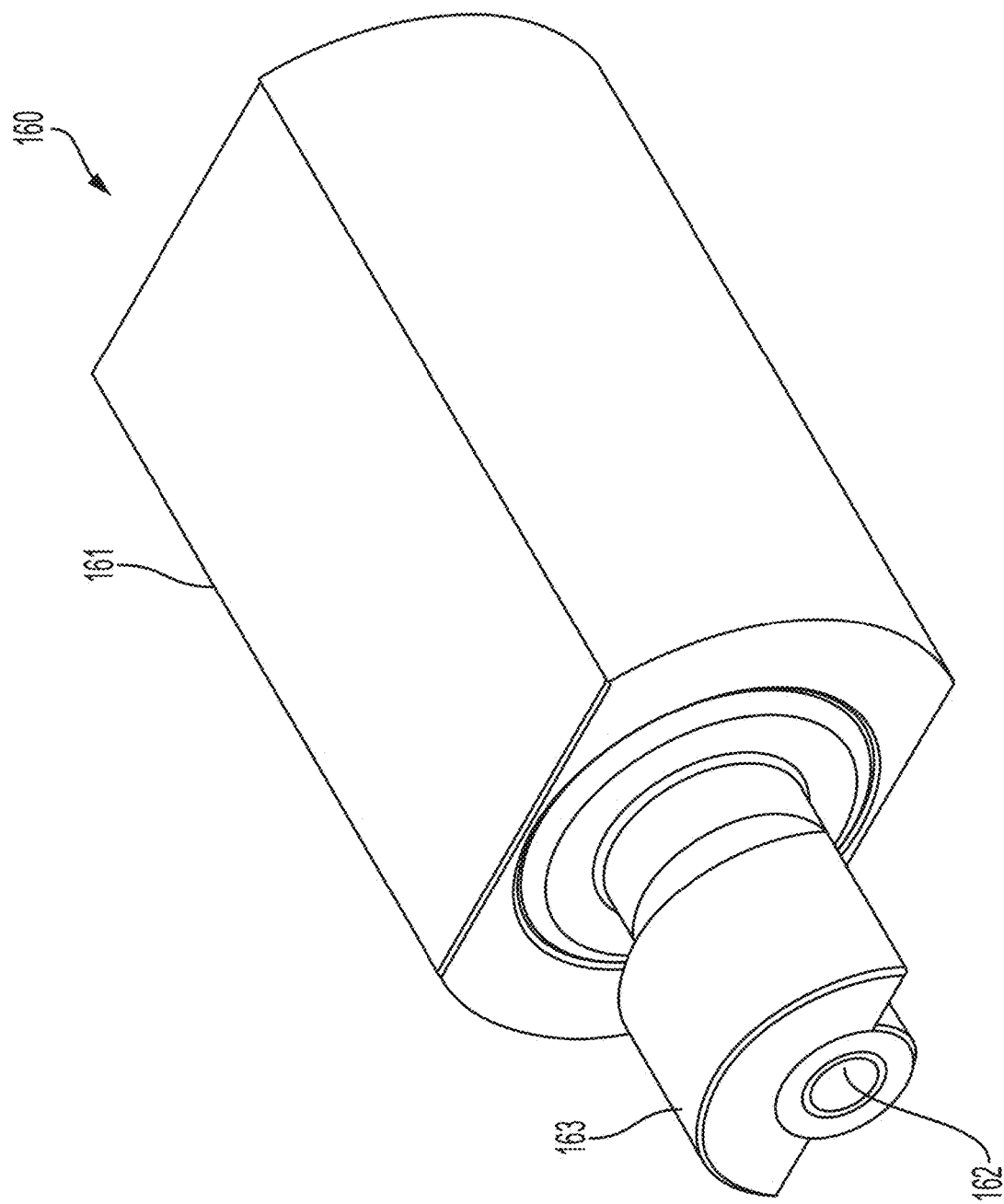
FIG. 5 is an example of a motor that may be used as a vibration source.

FIG. 5 shows an example of a motor 160 that may be used to operate as a vibration source to generate vibrations as described herein. Motor 160 may include a case 161, a shaft 162, and an eccentric mass counterweight 163. Motor 160 may be an electrical motor and may operate by rotating shaft 162 to cause eccentric mass counterweight 163 to rotate and thereby generate the vibrations described herein.

Figure 6:
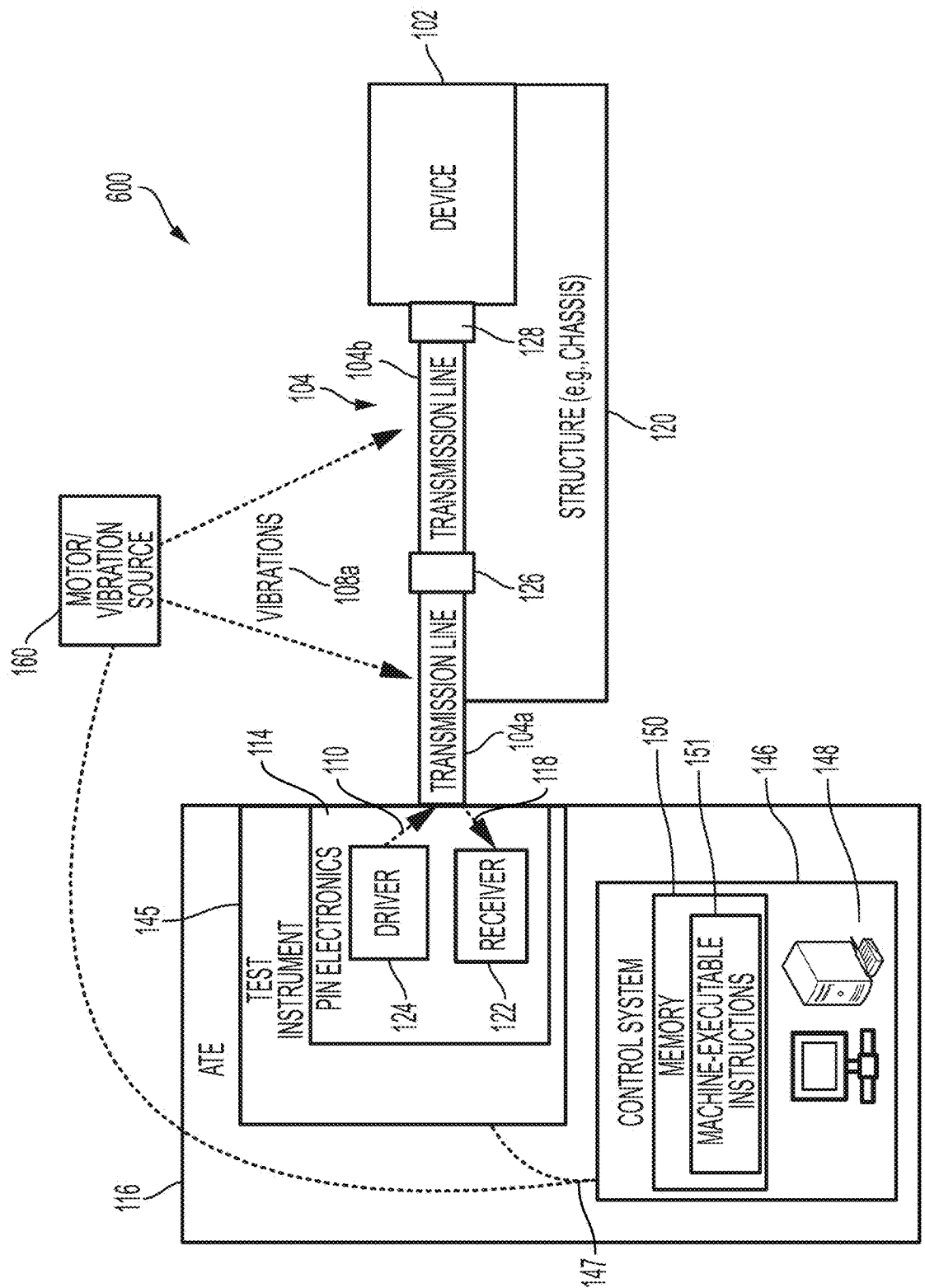
FIG. 6 is a block diagram of another example system for detecting a fault in a connection to, or along, a transmission line assembly.

In some implementations, a test setup such as that shown in FIG. 1 may include different types of vibration sources. For example, a test setup may include one or more motors and one or more audio output devices. FIG. 6 shows an example same test setup 600 that is substantially the same or identical to test setup 100 of FIG. 1 except that the vibration source 160 in this example is a motor that injects vibrations 108a into the transmission line and/or chassis. Otherwise, the operation of test setup 600 is substantially the same or identical to that of test setup 100 of FIG. 1.

In some implementations, during operation of all of some of the vibration sources, the DUT is powered off. In some implementations, during operation of all of some of the vibration sources, the DUT is powered on.

All or part of the systems and processes described herein including but not limited to process 300, and its modifications may be configured and/or controlled at least in part by one or more computers using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a system 100.

Actions associated with configuring or controlling the test system and processes described herein can be performed by one or more programmable processors executing one or more computer programs to control or to perform all or some of the operations described herein. All or part of the test systems and processes can be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks.

Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

All examples described herein are non-limiting.

In the description and claims provided herein, the adjectives "first", "second", "third", and the like do not designate priority or order unless context suggests otherwise. Instead, these adjectives may be used solely to differentiate the nouns that they modify.

Any mechanical or electrical connection herein may include a direct physical connection or an indirect physical connection that includes one or more intervening components. A connection between two electrically conductive components includes an electrical connection unless context suggests otherwise.

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A system comprising:
    a signal source to repeatedly output multiple instances of a same electrical signal to a transmission line, the transmission line being, or being associated with, a device under test (DUT);
    an apparatus configured to output an audio signal having a power level sufficient to generate a vibration in the transmission line, the vibration exposing an intermittent fault in the transmission line;
    a detector configured to monitor the transmission line and to detect information associated with the intermittent fault in the transmission line, wherein the detector is configured to detect a difference in an attribute associated with the multiple instances of a same electrical signal on the transmission line, the difference in the attribute corresponding to the information associated with the intermittent fault.

2. The system of claim 1, wherein the apparatus comprises a subwoofer.

3. The system of claim 1, wherein the apparatus comprises a low frequency effects transducer.

4. The system of claim 1, further comprising:
    test equipment comprising pin electronics, the detector comprising the pin electronics.

5. The system of claim 1, wherein the intermittent fault comprises one or more broken mechanical or electrical connections in the transmission line.

6. The system of claim 1, wherein the one or more broken mechanical or electrical connections comprise an open circuit in the transmission line.

7. The system of claim 1, wherein the intermittent fault comprises a short circuit in the transmission line.

8. The system of claim 1, wherein the transmission line comprises one or more connectors, the one or more connectors being susceptible to the vibrations to cause the open circuit.

9. The system of claim 1, wherein the audio signal has a power level sufficient to generate a vibration of a structure of the DUT to which the transmission line is in contact, the vibration of the structure causing the vibration in the transmission line.

10. The system of claim 1, wherein the DUT is powered off during vibration and monitoring.

11. The system of claim 1, wherein the power level sufficient to generate the vibration in the transmission line exceeds 250 Watts.

12. The system of claim 1, wherein the power level sufficient to generate the vibration in the transmission line exceeds 1 Kilowatt.

13. The system of claim 1, wherein the signal source and the detector are configured to perform time domain reflectometry (TDR) to detect the intermittent fault; and
    wherein the intermittent fault relates to an electrical impedance of the transmission line.

14. The system of claim 1, wherein the signal source and the detector are configured to perform spread spectrum time domain reflectometry (SSTDR); and
    wherein the intermittent fault relates to an electrical impedance of the transmission line.

15. The system of claim 1, wherein the signal source and the detector are configured to perform sequence time domain reflectometry (STDR); and
    wherein the intermittent fault relates to an electrical impedance of the transmission line.

16. A method comprising:
    outputting an audio signal from an audio output device that is proximate to a device under test (DUT), the audio signal being output at a power level sufficient to generate a vibration in a transmission line comprising, or associated with, the DUT, the vibration exposing an intermittent fault in the transmission line;
    transmitting a known signal on the transmission line at least during output of the audio signal while monitoring the transmission line; and
    detecting the intermittent fault in the transmission line during the monitoring.

17. The method of claim 16, further comprising:
    repeatedly outputting multiple instances of a same electrical signal to the transmission line;
    wherein detecting the intermittent fault comprises determining a difference in an attribute associated with the multiple instances of a same electrical signal on the transmission line.

18. The system of claim 16, wherein the audio signal is output using a subwoofer.

19. The system of claim 16, wherein the audio signal is output using a low frequency effects transducer.

20. The method of claim 16, wherein the intermittent fault comprises one or more broken mechanical or electrical connections in the transmission line.

21. The method of claim 16, wherein the one or more broken mechanical or electrical connections comprise an open circuit in the transmission line.

22. The method of claim 16, wherein the intermittent fault comprises a short circuit on the transmission line.

23. The method of claim 16, wherein the transmission line comprises one or more connectors, the one or more connectors being susceptible to the vibrations to cause the open circuit.

24. The method of claim 16, wherein the audio signal has a power level sufficient to generate a vibration of a structure of the DUT to which the transmission line is in contact, the vibration of the structure causing the vibration in the transmission line.

25. The method of claim 16, wherein the DUT is powered off during vibration, monitoring, and detecting.

26. The method of claim 16, wherein the power level sufficient to generate the vibration in the transmission line exceeds 250 Watts.

27. The method of claim 16, wherein the power level sufficient to generate the vibration in the transmission line exceeds 1 Kilowatt.

28. The method of claim 16, wherein detecting the intermittent fault comprises performing time domain reflectometry (TDR); and wherein the intermittent fault relates to an electrical impedance of the transmission line.

29. The method of claim 16, wherein detecting the intermittent fault comprises performing spread spectrum time domain reflectometry (SSTDR); and wherein the intermittent fault relates to an electrical impedance of the transmission line.

30. The method of claim 16, wherein detecting the intermittent fault comprises performing sequence time domain reflectometry (STDR); and wherein the intermittent fault relates to an electrical impedance of the transmission line.

31. A system comprising:

a vibration source configured generate a vibration in a vicinity of a transmission line comprising, or associated with, a device under test (DUT), the vibration exposing an intermittent fault in the transmission line;

a signal source to output a signal on the transmission line; and a detector configured to monitor the transmission line at least following output of the signal and to detect information associated with the intermittent fault in the transmission line.

32. The system of claim 31, wherein the vibration source comprises a motor.

33. The system of claim 31, wherein the vibration source comprises an audio output device.

34. The system of claim 31, wherein the vibration source comprises multiple motors configured to operate in a vicinity of the transmission line.

* * * * *